United States Patent Office 3,515,417
Patented June 2, 1970

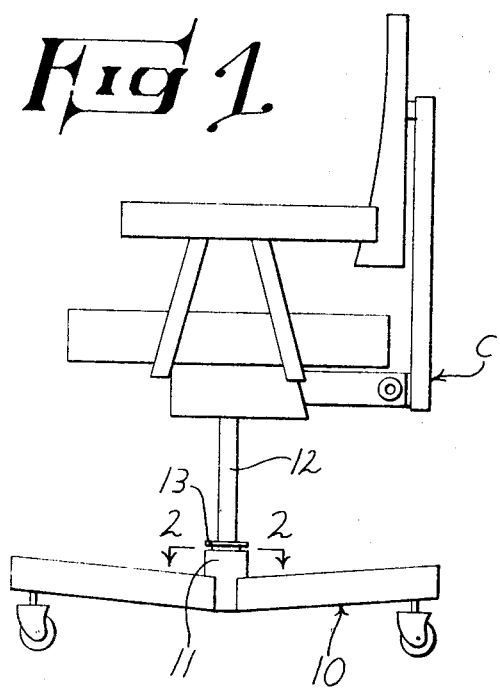
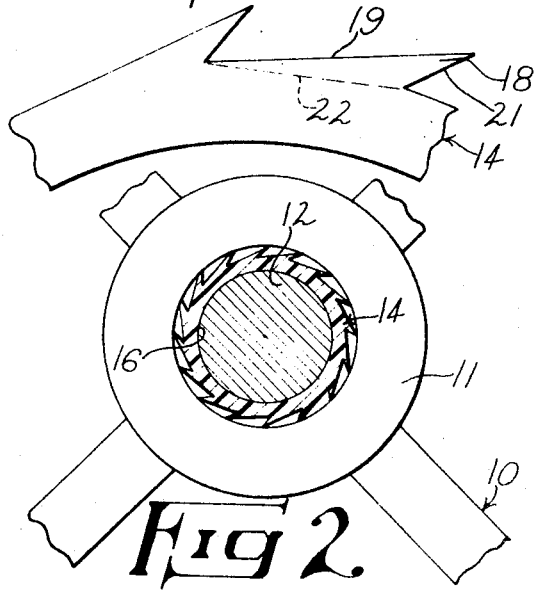
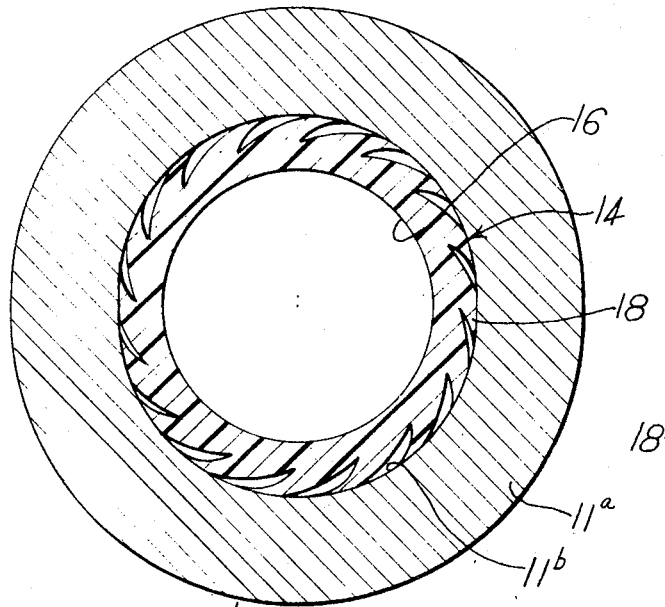

3,515,417
SELF-CENTERING BUSHING
John H. Bowman, Leeds, Ala., assignor to U.S.
Industries, Inc., a corporation of Delaware
Filed Mar. 27, 1969, Ser. No. 811,170
Int. Cl. F16d *1/06*
U.S. Cl. 287—52.04                                                    1 Claim

ABSTRACT OF THE DISCLOSURE

A bushing preferably made of plastic material such as nylon which has an accurately dimensioned inner bore and which carries on its outer peripheral surface a plurality of deformable splines or the like. Due to the deformable nature of the splines a bushing so equipped may be inserted in a bore which is not accurately machined, thereby to receive an accurately machined spindle, rod or the like, thus eliminating the necessity of having to machine the bore of such rough hub or outer port.

---

This invention relates to an improved bushing whereby an accurately machined inner surface may be provided in an unmachined hub, tube or the like, and so constructed that when the bushing is inserted the same is substantially self centering within the bore of the hub or other supporting structure thus eliminating the necessity of accurately machining the bore of the hub.

Another object is to provide a bushing, preferably made of plastic material such as nylon, the bushing being provided with an accurately formed inner bore to receive an accurately formed rod, pedestal or the like and the outer surface of the bushing being provided with a multiplicity of longitudinally extending apline-like members, the outer ends of which are adapted to contact the bore of the member in which the bushing is placed, the splines being flexible enough at their outer ends to make the bushing self centering relative to the bore of the hub.

A more specific object is to provide a bushing of the character designated in which the splines, in non-deformed shape are generally triangular, and in which the same extend outwardly from the general area of the body of the bushing, substantially the entire length thereof which is to be inserted into the bore.

A bushing illustrating feature of my invention is shown in the accompanying drawings forming a part of this application in which:

FIG. 1 is a view of a swivel chair having a base carrying a central hub member in which my improved bushing may be employed;

FIG. 2 is an enlarged detail sectional view taken generally along line 2—2 of FIG. 1;

FIG. 3 is an enlarged side elevational view of the bushing removed from the bore;

FIG. 4 is an enlarged detail sectional view corresponding generally to FIG. 2, but showing my improved self-centering bushing in place in an out of round bore in a hub member; and, FIG. 5 is an enlarged fragmental detail view illustrating more in detail the configuration of the splines on the outer surface of my improved bushing.

Referring now to the drawing for a better understanding of my invention I show, by way of illustration, a swivel chair C having a base portion 10 with a centrally disposed hub 11. A rod-like pedestal 12 of the chair is adapted to be rotatably supported from the hub and may carry a flange 13 to limit downward movement of the pedestal relative to the hub and base.

In the hub 11 I place my improved self-centering bushing indicated generally in the drawing by the numeral 14. As shown, the bushing 14 may be formed of plastic such as nylon and may have an accurately formed central bore 16 disposed to receive the inserted length of the pedestal or rod member 12.

My improved bushing may also have an upper section 17 adapted to fit on top of the hub portion 11 thus to prevent the bushing from slipping through the hub.

As shown, the bushing is provided with a multiplicity of longitudinally extending, flexible splines 18 preferably formed integrally with the body proper of the bushing. Further, these splines are generally of obtuse triangle shape as viewed in end elevation. The longer side of each of these triangular shaped splines indicated at 19 joins the body portion proper of the bushing generally tangentially. The shorter sides 21 join the outer ends of the sides 19 of the splines and connect to the body at more of a radial angle than do the sides 19. The bases of the triangular sections indicated by the dotted line 22 in FIG. 5 of course connect the inner ends of the sides 21 and 19 thus to complete the general triangular shape of the splines.

From a consideration of FIG. 4 the advantages of my invention may now be explained more fully. In FIG. 4 I show a hub member 11a which has an eccentrically disposed bore 11b therein, this eccentricity resulting either from rough manufacturing of the hub 11a or otherwise. As shown, when my improved bushing is simply inserted into such a rough or eccentric bore the splines on the major axis sides of the eccentric bore are deflected less than are the splines 18 on the minor axis side of such eccentric bore. Therefore, since the center 16 of the bushing 14 is accurately formed as by molding or otherwise, the bore of the bushing remains truly circular, and remains substantially of the correct size to receive the part 12. Therefore, I obtain accurate, self-centering of the bushing within a roughly formed bore of a hub, tube or the like in which it is inserted.

From the foregoing it will be apparent that I have devised an improved self-centering bushig useful in instances where it is desired to use rough, as manufactured parts such as mill rolled tubing as hubs or supports for shafts and the like. For instance, in the chair art, instead of having accurately to machine the bore 11b of the hub 11, with my improved bushing I am able to use run of the mill tubing and still maintain an accurate, centered, tight fit about the pedestal 12.

While I have shown my invention in but one form, it will be obvious to those skilled in the art that it is not so limited, but is susceptible of various other changes and modifications without departing from the spirit thereof.

What I claim is:
1. In a bushing,
   (a) a body, and
   (b) a plurality of outstanding flexible splines on the outer surface of the body disposed when the bushing is inserted into a bore generally conforming to the outer surface of the body of the bushing to contact the inner surface of the bore, said splines being of obtuse triangular shape as seen in transverse section with the bases thereof secured to the outer surface of the body of the bushing, the longer sides thereof joining the outer surface of the body substantially tangentially, and the third sides of said splines being shorter than the bases thereof and subtending with the bases the obtuse angle of the configuration, whereby when such bushing is inserted into the bore the bushing is substantially centered therein.

References Cited
UNITED STATES PATENTS

| | | |
|---|---|---|
| 1,609,130 | 11/1926 | Schacht. |
| 2,125,018 | 7/1938 | Hamill _____ 85—82 XR |
| 2,172,125 | 9/1939 | Hamill _____ 85—83 |
| 2,820,209 | 1/1958 | Whitted _____ 85—19 XR |
| 2,926,210 | 2/1960 | Sturges. |

FOREIGN PATENTS

| | | |
|---|---|---|
| 800,894 | 5/1936 | France. |
| 266,724 | 5/1950 | Switzerland. |

DAVID J. WILLIAMOWSKY, Primary Examiner

A. V. KUNDRAT, Assistant Examiner

U.S. Cl. X.R.

16—2; 287—85, 126